US012498672B2

(12) United States Patent
Parmigiani

(10) Patent No.: US 12,498,672 B2
(45) Date of Patent: Dec. 16, 2025

(54) ISLAMIC HIJIRI CALENDAR

(71) Applicant: PARMIGIANI FLEURIER S.A, Fleurier (CH)

(72) Inventor: Michel Parmigiani, Fleurier (CH)

(73) Assignee: PARMIGIANI FLEURIER S.A, Fleurier (CH)

( * ) Notice: Subject to any disclaimer, the term of this patent is extended or adjusted under 35 U.S.C. 154(b) by 321 days.

(21) Appl. No.: 18/000,234

(22) PCT Filed: Jun. 3, 2021

(86) PCT No.: PCT/IB2021/054849
§ 371 (c)(1),
(2) Date: Nov. 29, 2022

(87) PCT Pub. No.: WO2021/245581
PCT Pub. Date: Dec. 9, 2021

(65) Prior Publication Data

US 2023/0266714 A1 Aug. 24, 2023

(30) Foreign Application Priority Data

Jun. 3, 2020 (CH) ........................................ 655/20

(51) Int. Cl.
*G04B 19/253* (2006.01)
*G04B 19/24* (2006.01)

(52) U.S. Cl.
CPC ......... *G04B 19/2536* (2013.01); *G04B 19/24* (2013.01); *G04B 19/241* (2013.01)

(58) Field of Classification Search
None
See application file for complete search history.

(56) References Cited

U.S. PATENT DOCUMENTS 5,379,272 A * 1/1995 Parmigiani ........ G04B 19/2536 368/37
7,280,437 B2 * 10/2007 Rochat ................. G04B 19/253 368/37
2007/0002690 A1 * 1/2007 Rochat ................... G04B 19/25 368/28

FOREIGN PATENT DOCUMENTS

EP 0606576 A1 7/1994
WO 2015062839 A2 5/2015

OTHER PUBLICATIONS

Partial machine translation of Brauchart (WO 2015062839) (Year: 2015).*

* cited by examiner

*Primary Examiner* — Edwin A. Leon
*Assistant Examiner* — Sean R Brannon
(74) *Attorney, Agent, or Firm* — Colson Law Group, PLLC

(57) ABSTRACT

The invention relates to an Islamic Hijiri calendar for a mechanical clockwork movement comprising a 30-position date indicator arranged to be driven by a date-driving mechanism and to engage with a large rocker (7). A month control mechanism is arranged to differentiate between the months with 29 days and those with 30 days. A year control mechanism is arranged to differentiate between an abundant year and a common year. During a common year, a large rocker (7) is arranged to engage with a date star (9), to move two teeth of the date star (9) in order to move from the 29th of a month to the 1st of the following month, the large rocker (7) resting on the month cam (4).

17 Claims, 6 Drawing Sheets

ISLAMIC HIJIRI CALENDAR

The present invention relates to a mechanical Islamic Hijiri calendar, in particular for an analog timepiece. It relates to more particularly a perpetual Islamic Hijiri calendar which can equip the movement of a wristwatch as well as that of a clock or a pocket watch.

An Islamic Hijiri calendar is a widely used modern lunar calendar. This calendar is characterized by years of 12 lunar months which are shorter than the solar years. Each Islamic Hijiri year has about 354 days, or 355 days, which is 12 months of 29 and 30 days. Odd months have 30 days and even months 29, so the year starts with a month of 30 days and ends with a month of 29 or 30 days. In reality, one year of the Islamic Hijiri calendar lasts a little more than 354 days. To compensate for this difference, the last month of some years of a 30-year correction cycle have 30 days instead of 29. This 30-year cycle includes 19 years of 354 days, called common years, and 11 years of 355 days, called abundant years.

EP0606576 to the applicant describes an Islamic Hijiri calendar for an analog clockwork movement, comprising a 30-position date indicator advancing in steps of one position in order to successively display the numbers 1, 2, . . . 29, 30, 1, 2 . . . . The calendar comprises a first mechanism having the function of driving from a mobile of the movement, at the end of each day, the date indicator by a single step, a second mechanism engaging with said first mechanism and having the function of driving, at the end of even months, the date indicator by two successive steps to make it pass from the 29th to the 1st of the following month in a short time interval. The calendar further comprises a third mechanism engaging with the other two mechanisms and having the function of temporarily neutralizing the action of the second mechanism at the end of the abundant years, defined by a correction cycle of 30 years, so that the date indicator displays 30 the last day of the 12th and last month of these years.

WO2015062839 to the applicant describes an Islamic Hijiri calendar for a clockwork movement, comprising a 30-position date indicator advancing in steps of one position in order to successively display the numbers 1, 2, . . . 29, 30, 1, 2 . . . . The calendar comprises a first date-driving mechanism having the function of driving from a wheel of the movement, at the end of each day, the date indicator by a single step, a second corrective mechanism of the duration of the months arranged to engage with said first date-driving mechanism in order to drive, at the end of the 29-day month, the date indicator by two successive steps to move it from the 29th of one month to the 1st of the next month, the second month duration correcting mechanism comprising a month cam having six bumps and six recesses, each recess defining a position of the month cam corresponding to a 29-day month and each bump defining a position of the month cam corresponding to a 30-day month. The calendar further comprises a third locking mechanism engaging with said other two mechanisms and having the function of temporarily neutralizing the action of said second month duration correction mechanism at the end of the twelfth month of the abundant years, defined by a 30-year correction cycle. The third locking mechanism is arranged to lock the month cam in a position corresponding to a 30-day month in the last month of said abundant years, so that the date indicator displays 30 on the last day of the twelfth and last month of said abundant years.

The present invention proposes a simplified Islamic Hijiri calendar which displays the dates by respecting the alternation of the 29- and 30-day months in a year, and the succession of the common years and the abundant years within one of the 30-year correction cycles.

In accordance with the invention, an Islamic Hijiri calendar for a mechanical clockwork movement comprises a 30-position date indicator advancing by steps of one position to successively and cyclically display at the end of each day the numbers from 1 to 30, 1, 2 . . . said date indicator being arranged to be driven by a date-driving mechanism and to engage with a large rocker, a month control mechanism arranged to differentiate between the months with 29 days and those with 30 days, the month control mechanism comprising a month star engaging with a month cam comprising twelve positions, a year control mechanism arranged to differentiate between an abundant year and a common year, the year control mechanism comprising a year sector arranged cause a one-step skip by a year star coupled to a year cam having flattened teeth and having a rest surface on each flattened tooth on which a finger rests in each abundant year, the finger resting on a hollow portion between two flattened teeth to indicate a common year. The Islamic Hijiri calendar according to the invention is characterized in that the large rocker is arranged to engage during a common year with a date star to move forward by two teeth of the date star to go from the 29th to the 1st of the following month, the large rocker resting on the month cam.

Thanks to the present invention, the arrangement of the large rocker makes it possible to simplify the movement by avoiding the incorporation of a locking mechanism such as that known in the prior art.

Indeed, in the mechanisms of the prior art it is necessary to integrate a locking mechanism which must neutralize the action of a mechanism correcting the duration of the months. For example, a locking lever pivoting around an axis and having a feeler at one end applied against the year cam and a locking finger at the other end should be integrated. The locking lever is arranged so that the feeler is positioned during an abundant year on a bump of the year cam and the locking finger is in abutment against a pin provided on the eleventh bump of the month cam so as to lock and disengage the month cam and prevent its pivoting during the passage to the twelfth month of the abundant year, and so that, in common years, the locking lever is positioned so that the locking finger does not interfere with the pivoting of the month cam during the passage to the twelfth month of the common year.

Such a mechanism as described in the prior art is functional but more complicated to build and therefore to maintain.

In one embodiment, the large rocker is arranged to engage with the finger to cause the date star to skip a tooth in order to pass from the 30th to the 1st of the month in an abundant year.

According to this same embodiment, the finger is mounted so as to pivot about an axis and has at one end a spout designed to receive a tip of the large rocker in each abundant year.

In one embodiment, the year cam has eleven irregularly distributed flattened teeth.

According to this same embodiment, a year sector is arranged to make a year star skip one step every year according to a cycle of 30 years.

The features of the invention will become clearer upon reading the description of several embodiments given only by way of example, which is in no way limiting with reference to the schematic figures, in which.

Figure 1:
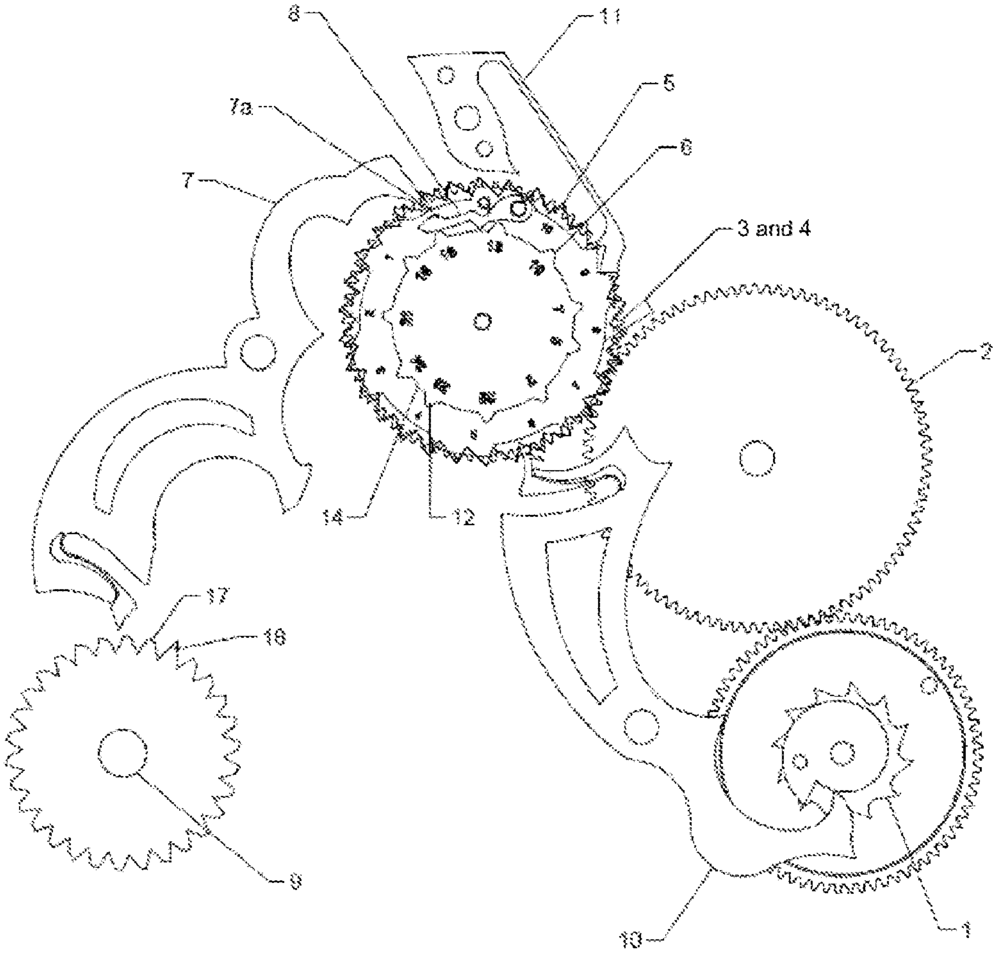
FIG. 1 shows a top view of an Islamic Hijiri calendar mechanism during a common year.

As shown in FIG. 1, an Islamic Hijiri calendar for a mechanical clockwork movement comprises a 30-position date indicator advancing by steps of one position to successively and cyclically display at the end of each day the numbers from 1 to 30, 1, 2 . . . said date indicator being arranged to be driven by a date-driving mechanism and to engage with a large rocker 7. The calendar further comprises a month control mechanism 1, 4 arranged to differentiate between the months with 29 days and those with 30 days, the month control mechanism comprising a month star 1 engaging with a month cam 4 comprising twelve positions. The calendar further comprises a year control mechanism arranged to differentiate between an abundant year and a common year, the year control mechanism comprising a year sector 10 arranged to cause a one-step skip by a year star 5 coupled to a year cam 6 comprising flattened teeth 12 and having a resting surface 13 (see FIG. 2) on each flattened tooth 12 on which a finger 8 rests in each plentiful year, the finger 8 resting on a hollow portion 14 between two flattened teeth 12 to indicate a common year.

During a common year, the large rocker 7 is arranged to engage with a date star 9, to move two teeth of the date star 9 in order to move from the 29th to the 1st of the following month, the large rocker 7 resting on the month cam 4.

In this example, the month star 1, thanks to intermediate wheels 2, 3, positions the month cam 4. A year sector 10 causes the year star 5 to skip one step per year on a thirty-year cycle. At the 12th month of the common year, the finger 8 is positioned, in the low position, in the recess of the year cam 6 out of the field of action of the tip 7*a* of the large rocker 7. The large rocker 7 makes two teeth of the date star 9 pass, to go from the 29th to the 1st of the next month.

The date star 9 has twenty-nine flattened teeth 17 and one pointed tooth 18 indicating the passage to a new cycle of days in a month.

Figure 2:
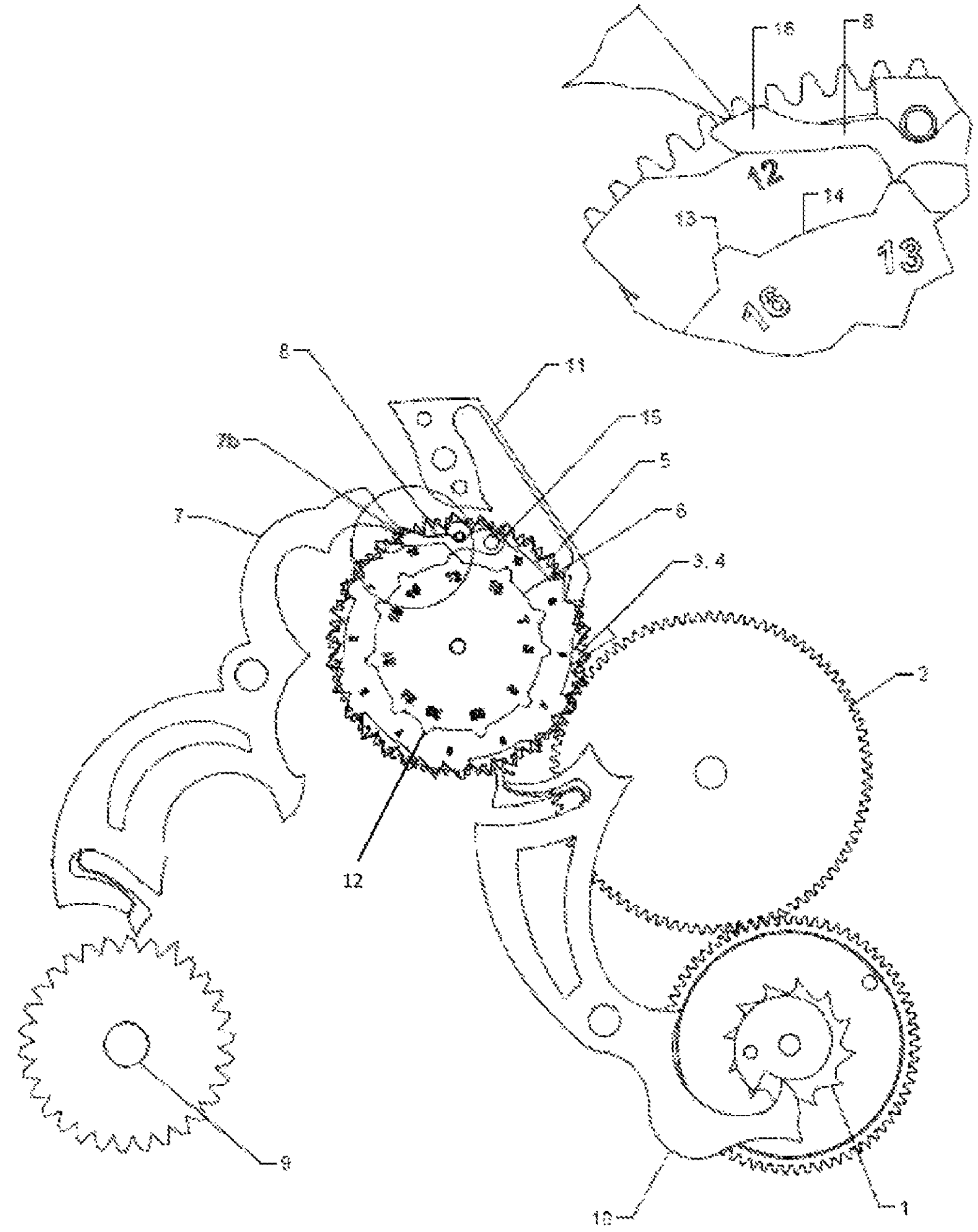
FIG. 2 shows a top view of an Islamic Hijiri calendar mechanism during an abundant year.
Figure 3:
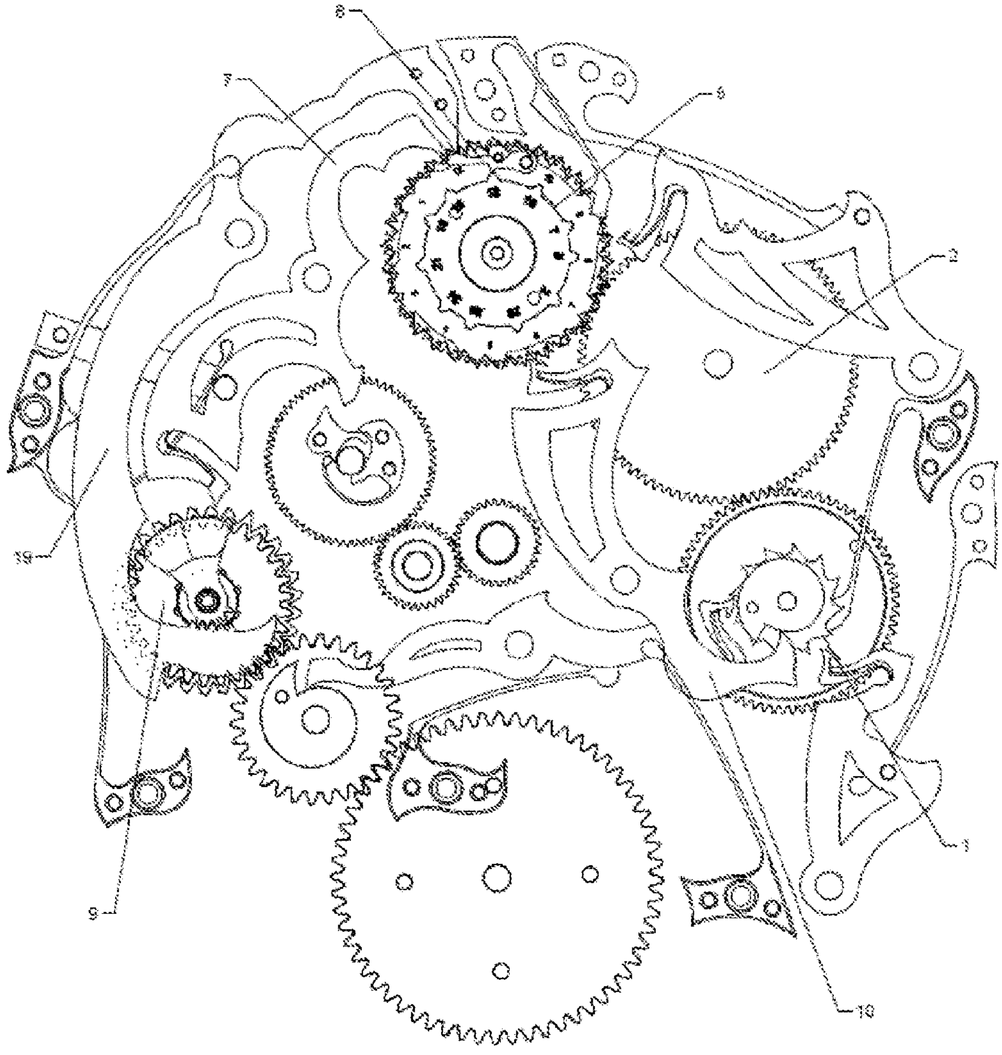
FIG. 3 shows a part of a watch movement comprising an Islamic Hijiri calendar mechanism according to the present invention.

As shown in FIG. 2, in an abundant year, the large rocker 7 is arranged to engage with the finger 8 so as to cause the date star 9 to skip a tooth to pass from the 30th to the 1st of the month.

The position of the month cam 4 indicates that the year is abundant. In this configuration, the finger 8 is located on the top of the year cam 6. The large rocker 7 is no longer resting against the month cam 4, but rather on the finger 8, causing the date star 9 to skip a tooth, in order to pass from the 30th to the 1st of the following month.

In each of these examples, the year cam 6 has eleven irregularly distributed flattened teeth 12.

The finger 8 is pivotally mounted around an axis 15 and has at one end a spout 16 arranged to receive a tip 7*b* of the large rocker 7 in each abundant year.

Figure 4:
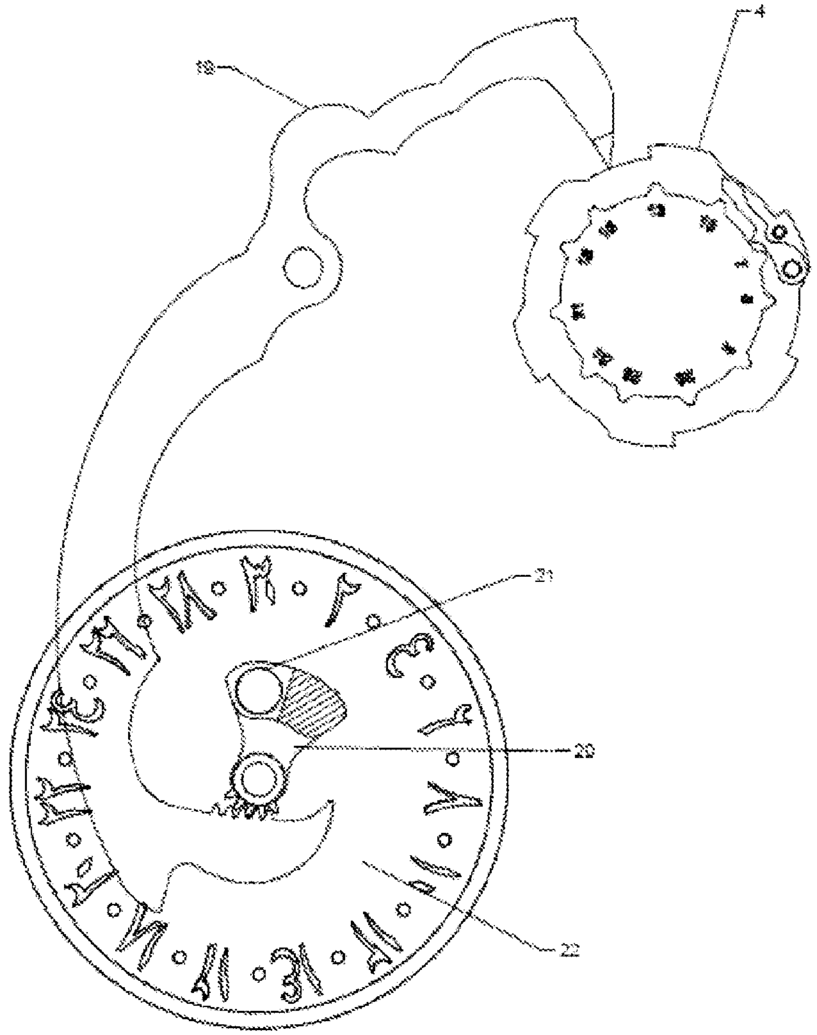
FIG. 4 shows a top view of a mechanism indicating on a watch face the presence of a month with a duration of 29 days.

As shown in FIG. 4, a rocker 19 senses the month cam 4 to determine whether the current month is a 29-day or 30-day month based on the twelve positions shown on said month cam.

For this purpose, a pad 20, thanks to two distinct indications, here two different colors, indicates to the wearer, through an opening 21 of the date window 22 if the month has a duration of 29 days or 30 days.

The rocker 19 is arranged to engage with a toothing of the pad 20 which pivots on the axis of the date star 9 and allows the display of the 29/30 indication through the date window. The rocker 19 moves the pad 20 from a first position where it indicates a month with a duration of 29 days to a second position where it indicates a month with a duration of 30 days, the rocker 19 being supported by the month cam 4.

In this example, the pad 20 is positioned to indicate a month with a duration of 29 days.

Figure 5:
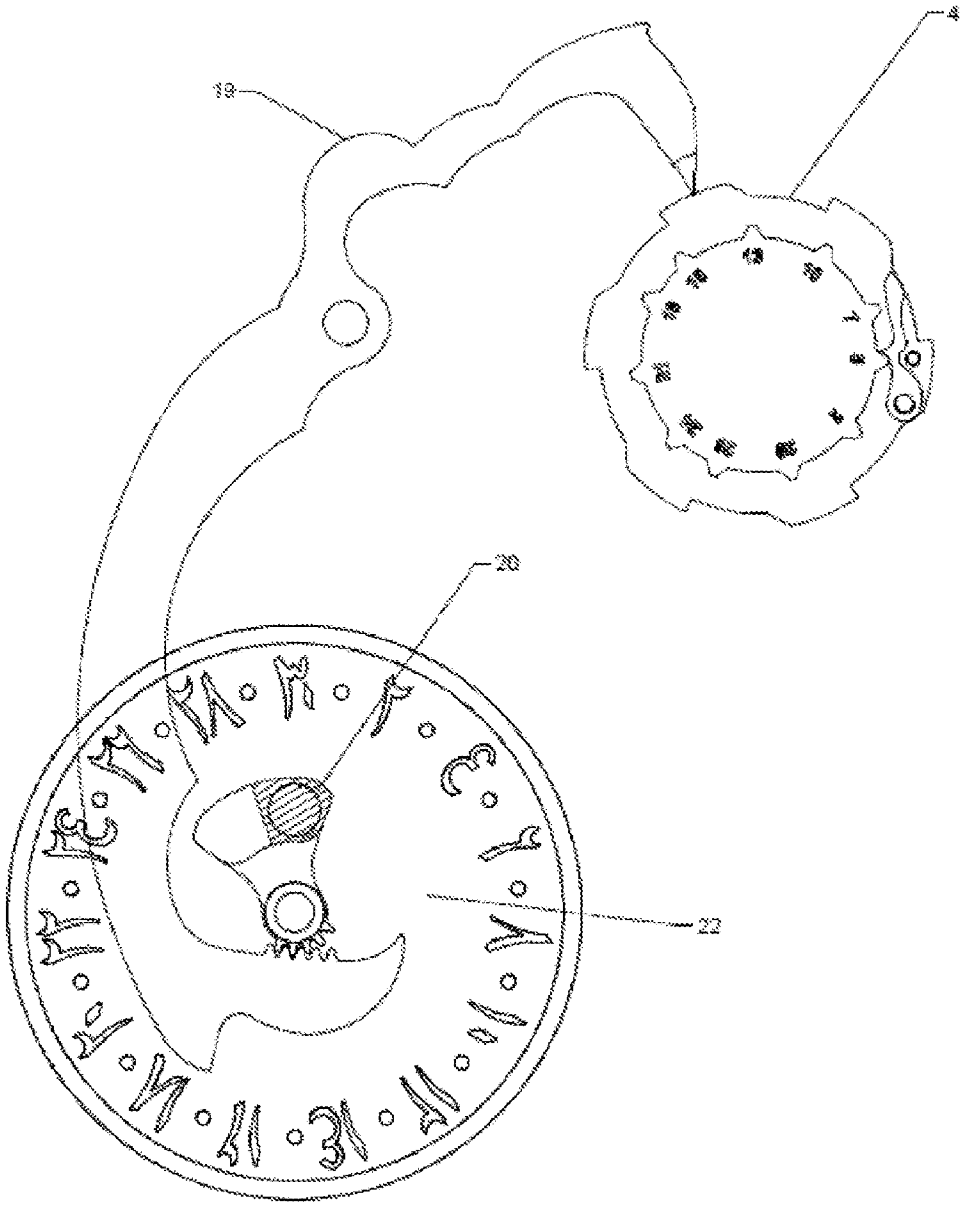
FIG. 5 shows a top view of a mechanism indicating on a watch face the presence of a month with a duration of 30 days.

In the example shown in FIG. 5, the rocker 19 senses the month cam 4 positioned to determine that the current month is a 30-day month.

Thus, the pad 20 is positioned to indicate to the wearer, through the opening 21 of the date window 22, that the current month is a 30-day month.

Figure 6:
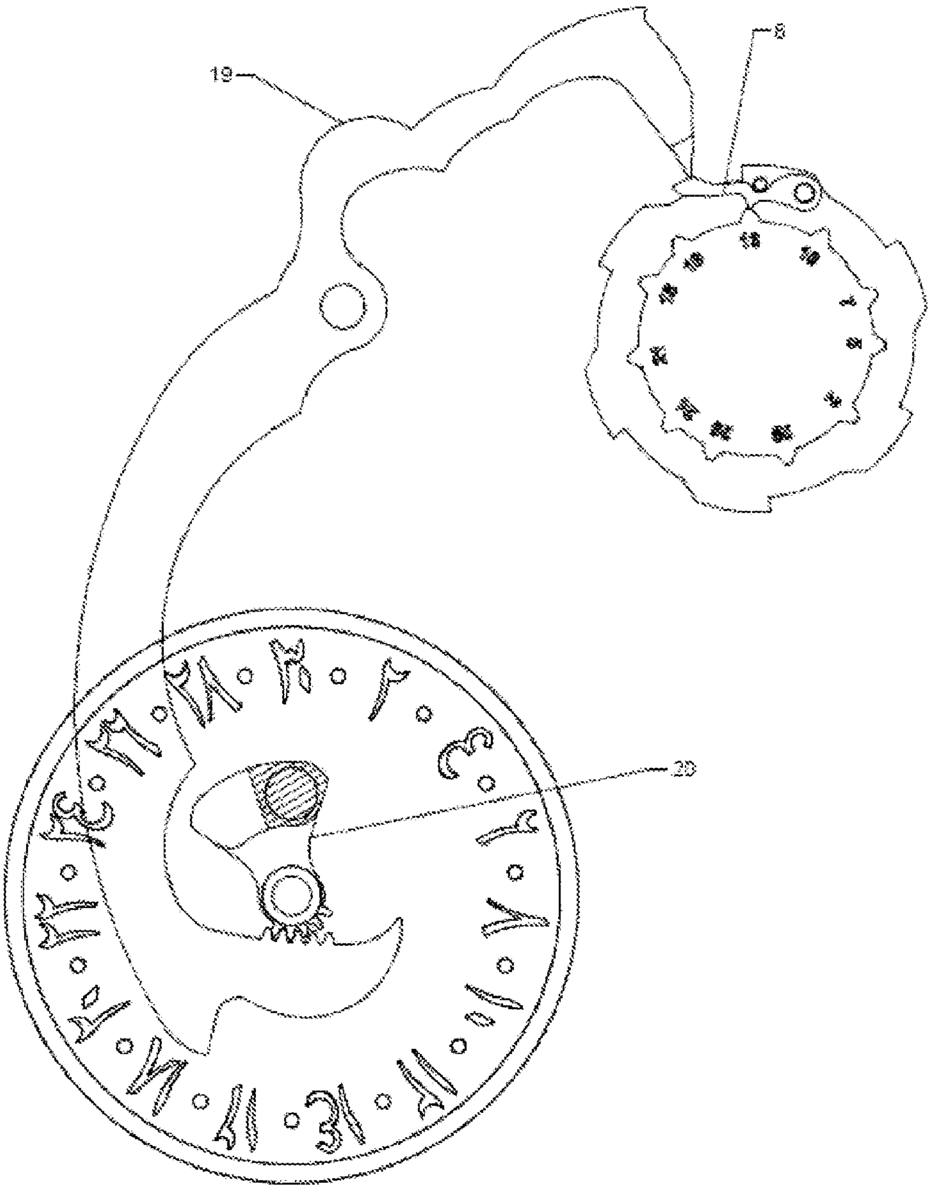
FIG. 6 shows a top view of a mechanism indicating the presence of a 30-day month during the last month of the year.

5 In the example shown in FIG. 6, during the last month of the year, it is the finger 8 that positions the rocker 19 to indicate a 30-day month.

In an abundant year, the finger 8 is located on the top of the year cam 6. The rocker 19 is no longer resting on the month cam 4, but rather on the finger 8, and allows the 30-day month to be displayed through the date window.

Such a calendar can be incorporated into a timepiece, such as a wristwatch or a clock.

The invention claimed is:

1. An Islamic Hijiri calendar for a mechanical clockwork movement, comprising:

a 30-position date indicator advancing by a step of one position each day to successively and cyclically display at the end of each day the numbers from 1 to 30, said date indicator being arranged to be driven by a date-driving mechanism and to engage with a large rocker;

a month control mechanism arranged to differentiate between the months with 29 days and those with 30 days, the month control mechanism comprising a month star engaging with a month cam comprising twelve positions; and, a year control mechanism arranged to differentiate between an abundant year and a common year, the year control mechanism comprising a year sector arranged to cause a one-step skip by a year star coupled to a year cam comprising flattened teeth and having a resting surface on each flattened tooth on which a finger rests in each plentiful year, the finger resting on a hollow portion between two flattened teeth to indicate a common year, wherein the finger is mounted on the month cam which is concentric with the year cam and in that the large rocker is arranged to rest on the month cam and, during a common year, engage directly with a date star, to pass two teeth of the date star from the 29th to the 1st of the next month, the large rocker resting on the month cam.

2. The calendar according to claim 1, wherein, in an abundant year, the large rocker is arranged to engage with the finger so as to cause the date star to skip a tooth to pass from the 30th to the 1st of the month.

3. The calendar according to claim 1, wherein the year cam has eleven irregularly distributed flattened teeth.

4. The calendar according to claim 1, wherein the finger is pivotally mounted about an axis and comprising at one end a spout arranged to receive a tip of the large rocker in each abundant year.

5. The calendar according to claim 1, wherein a year sector is arranged to skip a year star by one step per year, according to a 30-year cycle.

6. The calendar according to claim 1, wherein a rocker is arranged to engage with a toothing pivoting on the axis of the date star to move a pad from a first position where it indicates a 29-day month to a second position where it indicates a 30-day month, said rocker resting on the month cam.

7. The calendar according to claim 6, wherein the pad, by means of two distinct indications, is arranged to indicate, through an opening in a dial, whether the month has a duration of 29 days or 30 days.

8. A timepiece comprising an Islamic Hijiri calendar according to claim 1.

9. A timepiece according to claim 8 in the form of a wristwatch.

10. An Islamic Hijiri calendar for a mechanical clockwork movement, comprising:

a 30-position date indicator advancing by a step of one position each day to successively and cyclically display at the end of each day the numbers from 1 to 30, said date indicator being arranged to be driven by a date-driving mechanism and to engage with a large rocker;

a month control mechanism arranged to differentiate between the months with 29 days and those with 30 days, the month control mechanism comprising a month star engaging with a month cam comprising twelve positions; and, a year control mechanism arranged to differentiate between an abundant year and a common year, the year control mechanism comprising a year sector arranged to cause a one-step skip by a year star coupled to a year cam comprising flattened teeth and having a resting surface on each flattened tooth on which a finger rests in each plentiful year, the finger resting on a hollow portion between two flattened teeth to indicate a common year, the finger is pivotally mounted about an axis and comprising at one end a spout arranged to receive a tip of the large rocker in each abundant year, wherein the large rocker is arranged to engage during a common year with a date star, to pass two teeth of the date star from the 29th to the 1st of the next month, the large rocker resting on the month cam.

11. The calendar according to claim 10, wherein, in an abundant year, the large rocker is arranged to engage with the finger so as to cause the date star to skip a tooth to pass from the 30th to the 1st of the month.

12. The calendar according to claim 10, wherein the year cam has eleven irregularly distributed flattened teeth.

13. The calendar according to claim 10, wherein a year sector is arranged to skip a year star by one step per year, according to a 30-year cycle.

14. The calendar according to claim 10, wherein a rocker is arranged to engage with a toothing pivoting on the axis of the date star to move a pad from a first position where it indicates a 29-day month to a second position where it indicates a 30-day month, said rocker resting on the month cam.

15. The calendar according to claim 14, wherein the pad, by means of two distinct indications, is arranged to indicate, through an opening in a dial, whether the month has a duration of 29 days or 30 days.

16. A timepiece comprising an Islamic Hijiri calendar according to claim 10.

17. A timepiece according to claim 16 in the form of a wristwatch.

* * * * *